United States Patent [19]

Hirata et al.

[11] 4,380,780

[45] Apr. 19, 1983

[54] DISC-SHAPED RECORDING MEDIUM REPRODUCING APPARATUS

[75] Inventors: Atsumi Hirata, Fujisawa; Osamu Tajima, Ayase; Isami Kaneda, Yokohama; Hiroyuki Sugiyama, Isehara; Takashi Saito, Yokohama; Masafumi Mochizuki, Yamato, all of Japan

[73] Assignee: Victor Company of Japan, Ltd., Yokohama, Japan

[21] Appl. No.: 243,438

[22] Filed: Mar. 13, 1981

[30] Foreign Application Priority Data

Mar. 14, 1980 [JP] Japan .................................. 55/32542

[51] Int. Cl.³ .................. G11B 5/012; G11B 5/016; G11B 23/02; G11B 5/52
[52] U.S. Cl. .............................. 360/97; 360/99; 360/133; 360/86
[58] Field of Search .................... 360/97, 99, 86, 133, 360/135, 137

[56] References Cited

U.S. PATENT DOCUMENTS

| 3,899,794 | 8/1975 | Brown | 360/133 |
| 3,951,264 | 4/1976 | Heidecker | 360/135 |
| 3,959,823 | 5/1976 | Heidecker | 360/99 |
| 4,239,108 | 12/1980 | Coleman | 360/133 |
| 4,239,238 | 12/1980 | Coleman | 360/133 |

FOREIGN PATENT DOCUMENTS 2373121 12/1977 France .
2374716 12/1977 France .

Primary Examiner—Robert M. Kilgore
Attorney, Agent, or Firm—Louis Bernat

[57] ABSTRACT

A reproducing apparatus reproduces a loaded disc-shaped recording medium derived from a case. The case comprises a jacket which has a space for accomodating the disc-shaped recording medium and an opening for allowing the disc-shaped recording medium to go in and out of the jacket, and a lid member inserted through the opening of the jacket for closing the opening of the jacket. The reproducing apparatus comprises an inserting opening through which the case is inserted, a turntable for rotating the disc-shaped recording medium, a clamping mechanism for clamping at least one of the disc-shaped recording medium or the lid member provided at the innermost part on the opposite side from the inserting opening with respect to the turntable, a detecting mechanism for detecting whether the disc-shaped recording medium is loaded within the reproducing apparatus, and an arresting mechanism provided at the vicinity of the inserting opening, for arresting the insertion of a jacket having the lid member into the reproducing apparatus and allowing the insertion of a jacket not having the lid member into the reproducing apparatus, by displacing according to the detecting operation of the above detecting mechanism. The arresting mechanism allows the insertion of the jacket having or not having the lid member into the reproducing apparatus in a state where the detecting mechanism is not performing a detecting operation.

7 Claims, 9 Drawing Figures

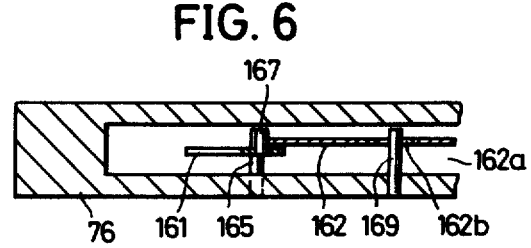
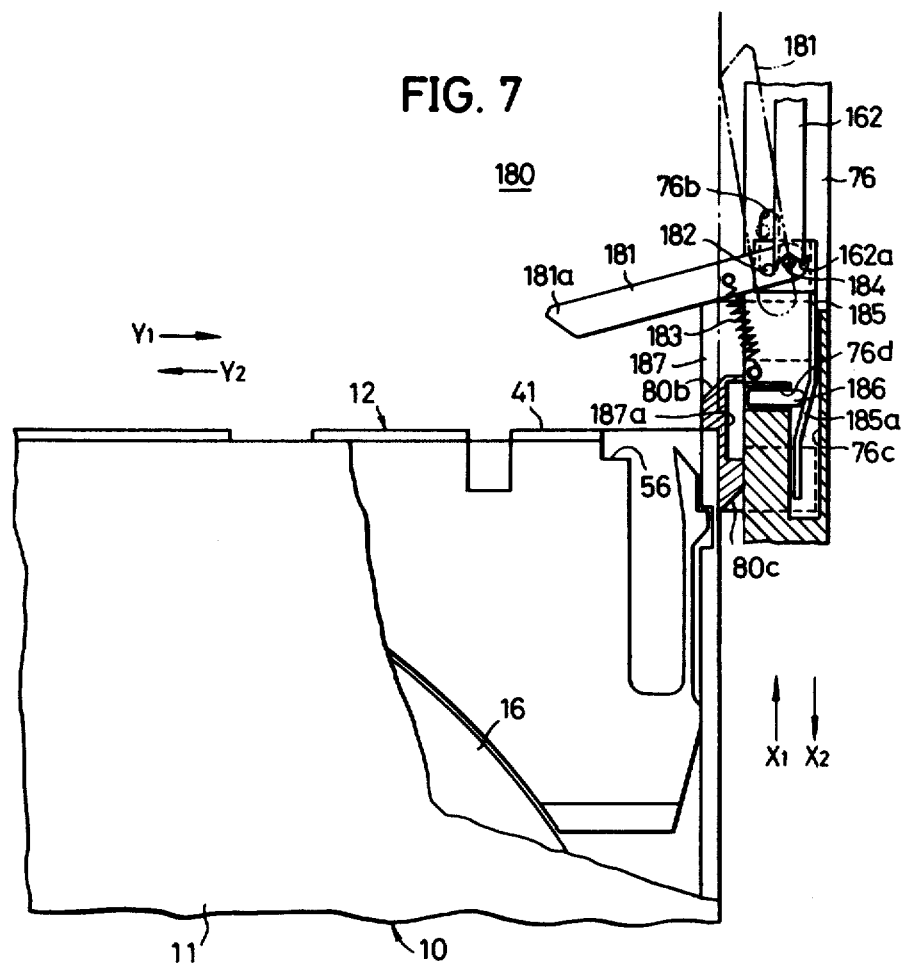

4,380,780

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and constructed to prevent an erroneous operation in which an attempt is made to load a disc-shaped recording medium into the reproducing apparatus in a state where a disc-shaped recording medium is already loaded within the reproducing apparatus.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc case which has a lid and accommodates a disc therein, from within the reproducing apparatus. In this type of an apparatus, it becomes necessary to positively clamp the disc at an accurate position within the apparatus. However, in the conventional reproducing apparatus, the disc is clamped upon pulling out of the disc case from the reproducing apparatus, for example, and hence, suffered disadvantages in that the disc may not be clamped when the insertion and the pulling out operation of the disc case is rapidly performed, and that the disc may be pulled out from the reproducing apparatus together with the disc case.

Another example of a conventional type of a disc case comprises a rigid jacket for accommodating a disc, and a tray having a front part which is engaged by engaging means upon complete insertion of the disc case within the reproducing apparatus and an annular or ring portion fixed to the front part for encircling the outer periphery of the disc. The reproducing apparatus which operates together with this disc case, is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the disc case for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in a United States patent application entitled "DISC-SHAPED RECORDING MEDIUM REPRODUCING APPARATUS" in which the assignee is the same as the assignee of the present application, a disc-shaped recording medium reproducing apparatus was proposed where the reproducing apparatus comprises a mechanism for enlarging an opening and its adjacent parts of a jacket upon loading of a disc which is incased inside the jacket, into the disc reproducing apparatus, and a mechanism for clamping which enters inside the jacket to clamp the disc incased inside the jacket, by riding over a lid plate which closes the opening of the jacket. According to this proposed reproducing apparatus, there is an advantage in that the disc does not make any unnecessary contact with the jacket and scratches are not introduced, when the jacket is pulled out from the reproducing apparatus after placing the disc inside the reproducing apparatus, or when accommodating the disc placed inside the reproducing apparatus into the empty jacket, since the opening of the jacket is in an enlarged state. Furthermore, another advantage this proposed reproducing apparatus has is in that the jacket can easily be pulled out from the reproducing apparatus after placing the disc inside the reproducing apparatus, since the disc is clamped by the clamping mechanism of the reproducing apparatus, and in addition, because the lid plate is independent from the operation in which the disc is relatively pulled out from within the jacket, the construction of the disc case becomes quite simple, enabling the disc case to be manufactured at low cost.

However, in this type of a reproducing apparatus, when a jacket (disc case) having a lid and accommodated with a disc therein is erroneously inserted forcibly into the reproducing apparatus in a state where a disc is still loaded within the reproducing apparatus, an accident is introduced in which the disc and the parts within the reproducing apparatus are damaged.

Therefore, it is highly desirable to provide preventing means for preventing a double-insertion of the disc case, in which a disc case accommodated with a disc therein is erroneously inserted into the reproducing apparatus in a state where a disc is already loaded within the reproducing apparatus.

SUMMARY OF THE INVENTION

Accordingly, a general object of the present invention is to provide a novel and useful disc-shaped recording medium reproducing apparatus in which the above described problems have been overcome.

Another and more specific object of the present invention is to provide a disc-shaped recording medium reproducing apparatus provided with an erroneous insertion preventing mechanism for disabling the erroneous insertion of a jacket (disc case) having a lid and accommodated with a disc therein, into the reproducing apparatus in a state where a disc is already loaded within the reproducing apparatus.

Still another object of the present invention is to provide a disc-shaped recording medium reproducing apparatus provided with a mechanism for detecting whether a jacket being inserted into the reproducing apparatus has a lid, and preventing the insertion of a jacket having a lid in a state where a disc is already loaded within the reproducing apparatus.

Other objects and further features of the present invention will be apparent from the following detailed description when read in conjunction with the accompanying drawings.

BRIEF DESCRIPTION OF THE DRAWINGS

FIG. 6 is a cross-sectional diagram of the mechanism in FIG. 3 along the line VI—VI; and FIGS. 7, 8, and 9 are plan views respectively showing another embodiment of a double-insertion preventing mechanism, in each operating state.

DETAILED DESCRIPTION

Figure 1:
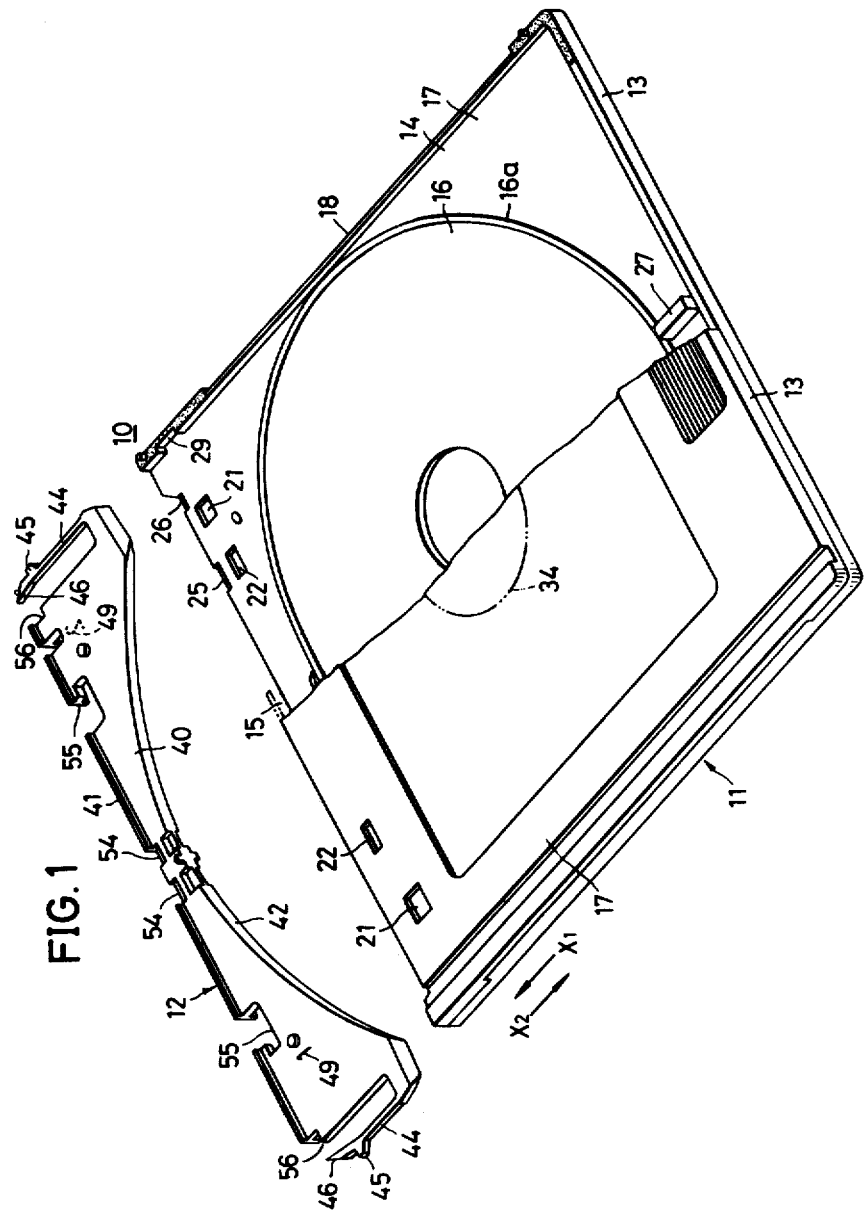
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 is open at an opening 15 at the front side of the jacket 11 and is closed on the other three sides, and accommodates a disc 16. The thickness of the space 14 is slightly larger than that of the disc 16. The jacket halves 13 are, for example, made of styrol resin, and has a preferable flexibility so as to allow the enlarging of the opening 15 as will be described later, and also has a suitable hardness to protect the disc 16 accommodated therein.

Each of the jacket halves 13 comprises a flat plate part 17 and a rib 18 which is unitarily formed with the flat plate part 17 and are continuous in the three sides. A display window 21 and a pair of engaging windows 22 and 22 are provided on the flat plate part 17. Sloping surfaces 25 and 26 are formed at the open edge portion of the flat plate part 17 of the jacket halves 13, and a projection 27 is formed at the innermost portion of the flat plate part 17. A depression 29 is formed at a predetermined position near the front inner side surface of each of the rib 18. The lid plate 12 comprises a plate-shaped main lid body 40 which is inserted into the front portion of the space 14 through the opening 15 of the jacket 11 and closes the opening 15, and a rim portion 41 formed unitarily at the front edge of the main lid body 40, which is fixed to the front edge of the jacket 11 and does not enter within the opening 15. The lid plate 12 is, for example, made of acrylonitrile butadiene styrene (ABS) resin. An arcuate part 42 having a radius of curvature larger than the radius of the disc 16, is formed at the rear end part of the main lid body 40. A pair of engaging arms 44 and 44 are formed on both sides of the main lid body 40. A projection 45 which engages with the depression 29 of the jacket 11 is provided at the outer side on each of the engaging arm 44, and a sloping surface 46 is formed at the tip end on each of the engaging arm 44.

The base portions of the engaging arms 44 are unitarily formed on the rear end of the main lid body 40 and extend in the forward direction, while the free ends of the engaging arms 44 can undergo resilient distortion. Upon insertion of the lid plate 12 into a predetermined position within the jacket 11, the projection 44 engages into the depression 29 in the side wall of the jacket 11, due to the flexibility of the engaging arm 44. Accordingly, the vertical surface becomes fixed at the inner surface of the depression 29, and the lid plate 12 is thus prevented from slipping out from the jacket 11.

A display 49 which displays a "1" or a "2" (or, "A" or "B") to indicate the side of the disc 16, is respectively provided at a position corresponding to the position of the display window 21, on the upper and lower surfaces of the main lid body 40. Clamping finger ride-over parts 54 and 54 are respectively formed at the upper and lower surfaces of the main lid body 40 where it is narrow because of the shape of the arcuate part 42, so that a clamping finger of the reproducing apparatus, which will be described later on, can easily ride over the clamping finger ride-over parts 54.

A pair of L-shaped cutouts 55 and 55 are formed at the front end of the main lid body 40 through the rim portion 41. As will be described later, a lid plate locking finger and jacket opening enlarging finger of the reproducing apparatus are inserted into the cutouts 55. A pair of L-shaped cutouts 56 are respectively formed on both sides of the front part of the main lid body 40 along the rim portion 41.

Figure 2:
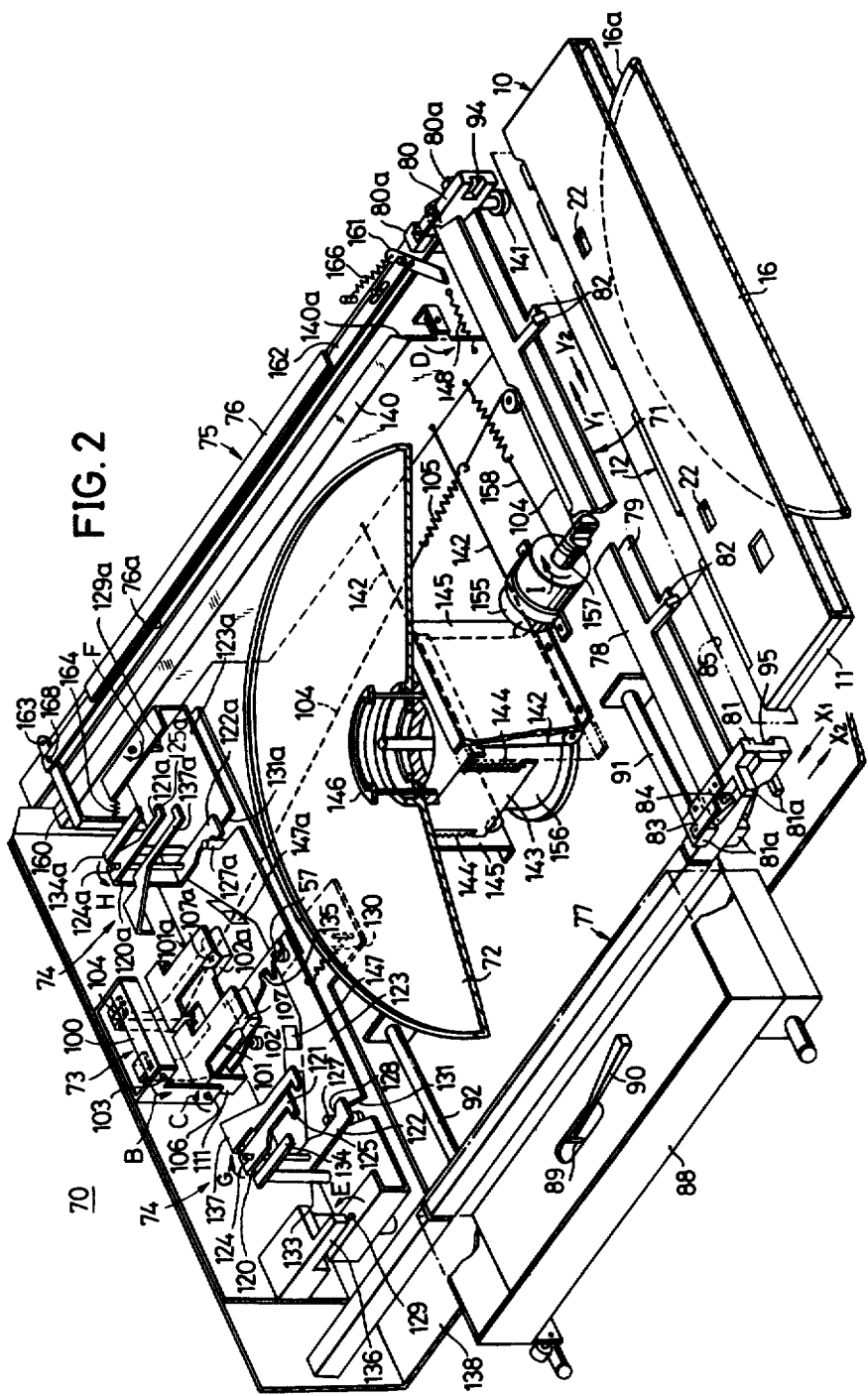
FIG. 2 is a perspective view showing the inner construction of a disc reproducing apparatus according to the present invention, with a part cut away.

As shown in FIG. 2, a reproducing apparatus 70 substantially comprises a jacket opening enlarging mechanism 71, a turntable 72 to rotate the disc 16 positioned thereon, a disc clamping mechanism 73 for clamping the disc 16, a lid plate locking mechanism 74 for locking the lid plate 12, double-insertion preventing mechanism 75 which forms the essential part of the apparatus according to the present invention, and the like.

Both sides of the jacket opening enlarging mechanism 71 are guided by guide rails 76 and 77, and the enlarging mechanism 71 moves between the innermost part of the reproducing apparatus 70 and a disc case inserting opening 85 provided at the frame of the reproducing apparatus 70, in the directions of the arrows X1 and X2. Upper and lower beams 78 and 79 extend in the directions of the arrows Y1 and Y2 as shown in FIG. 2, and both ends of the respective beams 78 and 79 are supported by sliders 80 and 81. These sliders 80 and 81 are respectively fixedly inserted into the guide rails 76 and 77. Enlarging fingers 82 are respectively formed on each of the beams 78 and 79, in a direction facing the inserting opening 85 of the reproducing apparatus 70. When the enlarging fingers 82 are positioned on the side of the inserting opening 85, a roller 84 enters inside a tapered depression, due to the action of a leaf spring 83. Hence, the upper beam 78 is inclined downwards, and the lower beam 79 is inclined upwards. Moreover, each enlarging finger 82 makes contact with another enlarging finger 82, and the tip ends of the enlarging fingers 82 coincide at a height at the center of the inserting opening 85. When the beams 78 and 79 move in the direction of the arrow X1, the roller 84 rides over the tapered depression so that the beams 78 and 79 are rotated into horizontal positions, and thus, the enlarging fingers 82 rotate in upward and downward directions so as to mutually separate from each other.

The sliders 80 and 81 are respectively provided with two pairs of fingers 80a and 81a. These fingers 60a and 81a respectively hold the guide rails 76 and 77, and stably guide the supporting members 80 and 81 along the guide rails 76 and 77. A pickup frame 88 is provided with a reproducing stylus 89 and a cantilever 90, and moves in the directions of the arrows Y1 and Y2 along guide rods 91 and 92.

The disc clamping mechanism 73 and the lid plate locking mechanism 74 are constructed symmetrically on the left and right sides with respect to a line which passes through the center of the turntable in the direction of the arrow X1. The parts on one side are designated by the same reference numerals as the corresponding parts on the other side, with a subscript "a", and their description will be omitted.

The disc clamping mechanism 73 is provided at the inner part of the reproducing apparatus 70 on the opposite side of the inserting opening 85, and comprises a pair of upper clamping fingers 101 and 101a. The lower clamping finger 100 unitarily comprises a pair of projected clamping parts 102 and 102a, and is axially supported on an upper pin 103. A wire 104 is linked to the clamping finger 100, and the clamping finger 100 receives a rotational force in the direction of arrow B due to the force of a spring, that is, the clamping finger 100 receives a force urging rotation in the upward direction. The pair of upper clamping fingers 101 and 101a are respectively axially supported by a pin 106, and make contact with the clamping parts 102 and 102a the rotation of projecting parts 107 and 107a in the downward direction by their own weight.

In the lid plate locking mechanism 74, a locking member 120 comprises an upper locking finger 121 and a lower cam finger 122, and is axially supported by a pin 124 embeddedly formed on a main lever 123. An L-shaped part 125 is formed at the tip end of the locking finger 121, and a cam 128 which operates together with a fixing pin 127 embeddedly formed on an L-shaped bracket 126, is formed on the cam finger 122. The locking member 120 is urged to rotate in a direction where the cam 128 make contact with the fixing pin 127.

The main lever 123 is axially supported by a shaft 129, and rotates in the clockwise direction by a spring 130. An arcuate cutout 131 makes contact with the pin 127. Furthermore, the main lever 123 is linked to the other main lever 123a by a pin 57 and a longitudinal opening (not shown), and the two levers 123 and 123a rotate in mutually opposite directions. A contact finger 134 which is pushed by the lid plate 12 upon insertion of the disc case 10 inside the reproducing apparatus 70, is fixed on a pin 133.

A latch 135 locks a pin 57 when the pin 57 first moves in the direction of the arrow X1, and then releases the locking of the pin 57 when the pin 57 next moves in the same direction, that is, in the direction of the arrow X1.

Upon reproduction of the disc 16, the disc case 10 is inserted through the inserting opening 85 of the reproducing apparatus 70, by inserting the disc case 10 with the side of the lid plate 12 into the direction of the arrow X1. Both end parts of the disc case 10 are respectively inserted into depressions 94 and 95 of the sliders 80 and 81, and the jacket opening enlarging mechanism 71 is pushed and moved in the direction of the arrow X1 by the disc case 10. When the enlarging mechanism 71 moves, the roller 84 slips out of the tapered part to put the upper and lower beams 78 and 79 in horizontal state, and the enlarging fingers 82 thus respectively move in a direction to mutually separate from each other. Accordingly, the tip ends of the enlarging fingers 82 engage with the engaging windows 22 of the jacket 11, and enlarge the front part of the upper and lower jacket halves 13 upwards and downwards, to enlarge the opening 15.

A sloping surface 140a of a rotary plate 140 is pushed by a roller 141, and the rotary plate 140 rotates in the direction of the arrow D, due to the movement of the jacket opening enlarging mechanism 71. Accompanied by the rotation of the rotary plate 140, wires 142 are pulled, and a push-up plate 143 is accordingly pulled downwards. Four corners of the push-up plate 143 are suspended and supported by springs 144 with respect to a support plate 145. Due to the downward movement of the push-up plate 143, the push-up body 146 which is capable of unitarily rotating with the turntable 72 and moving up and down, moves downwards, to retreat from the insertion passage of the disc case 10.

When the disc case 10 is inserted into the innermost part of the reproducing apparatus 70 together with the enlarging mechanism 71 through the upper side of the turntable 72, the ride-over parts 54 of the lid plate 12 enter between the clamping parts 102 and 107 (102a and 107a) which are psotioned mutually opposite to the clamping fingers 100, 101, and 101a, and pass through these clamping parts by pushing and spreading these parts. The clamping fingers 100, 101, and 101a close after the ride-over parts 54 of the lid plate 12 have passed through, and the clamping parts 102 and 107 accordingly clamp the groove guard 16a of the disc 16.

Accompanied by the insertion of the disc case 10, the locking fingers 121 and 121a relatively enter inside the cutouts 55 of the lid plate 12, and the rim portion 41 accordingly pushes the contact fingers 134 and 134a. When the contact fingers 134 and 134a are pushed by the lid plate 12, the main levers 123 and 123a respectively rotate in the directions of the arrows E and F. Due to the above rotation of the main lever 123, the cam 128 of the cam finger 122 is guided by the fixing pin 127, and the locking member accordingly rotates in the direction of the arrow G. Similarly, the locking member 120a rotates in the direction of the arrow H due to the rotation of the main lever 123a. Hence, the locking fingers 121 and 121a rotate in directions so as to mutually separate from each other, and the L-shaped parts 125 and 125a provided at the tip ends of the above locking fingers 121 and 121a respectively enter into the innermost parts of the cutouts 55, to lock the lid plate 12. The lid plate 12 is thus locked and supported at the innermost part of the reproducing apparatus 70 in a state in which the lid plate 12 is placed and supported on supporting fingers 137 and 137a.

Furthermore, the engagement releasing members 136 enter inside the openings on the left and right sides of the disc case 10, and push the sloping surfaces 46 at the tip ends of the engaging arms 44. Accordingly, the engaging arms 44 respectively are distorted inwards, and the projections 45 respectively slip out from the depressions 29, to release the engagement of the lid plate 12 with respect to the jacket 11.

When the main levers 123 and 123a rotate to positions where they are latched, the leaf springs 147 and 147a respectively provided at the bent parts of the main levers push against the vertically extending part 111 of the upper clamping fingers 101 and 101a. Hence, a rotational force in the direction of the arrow C is applied to each clamping fingers 101 and 101a. Thus, the disc 16 is clamped at a predetermined height by the lower clamping finger 100 and the upper clamping fingers 101 and 101a.

Accordingly, when the disc case 10 is inserted into the final position, the engagement of the lid plate 12 with respect to the jacket 11 is released, and the disc 16 thus becomes clamped by the clamping fingers 100, 101, and 101a.

Next, the jacket 11 is pulled out in the direction of the arrow X2. Since the lid plate 12 and the disc 16 are respectively locked and clamped and described above, only the jacket 11 is moved in the direction of the arrow X2, leaving behind the lid plate 12 and the disc 16. Accompanied by this pulling out of the jacket 11, the lid plate 12 and the disc 16 are relatively pulled out from within the jacket 11. Because the opening 15 of the jacket 11 is in an enlarged state then, there is no possibility of the disc 16 being scratched by sliding against the inner surfaces of the jacket 11.

Accompanied by the movement of the jacket 11 in the direction of the arrow X2, the jacket opening enlarging mechanism 71 also moves together with the jacket in the direction of the arrow X2, since a step part of the jacket opening enlarging fingers 82 engages with the engaging windows 22 of the jacket 11. When the jacket 11 is pulled out to the vicinity of the inserting opening 85, the rotary plate 140 rotationally returns due to a spring 148 and the push-up body 146 moves up to support the center part of the disc 16. Furthermore, when the jacket 11 is pulled out, the disc 16 completely separates from the jacket 11, the jacket opening enlarging mechanism 71 returns to its original position, and the jacket opening enlarging fingers 82 rotate in directions so as to mutually close upon each other and separate from the engaging windows 22. The jacket 11 returns to its original state due to its flexibility, and the enlarged opening 15 also returns to the original state, and the jacket 11 is completely pulled out from the reproducing apparatus 70. In this state, the disc 16 is supported horizontally at a position above the turntable 72, by the clamping fingers 100, 101 and 101a and the push-up body 146.

When a play button (not shown) is then pushed, a motor 155 and a turntable motor 156 begin to rotate, and a take-up shaft 157 rotates in the direction of arrow I, and hence wires 104 and 158 are thus pulled out from the take-up shaft 157. Accordingly, the rotary plate 140 rotates in the direction of the arrow D, due to a spring 148 and the clamping finger 100 rotates in a direction opposite to the direction of the arrow B, to release the clamping with respect to the disc 16 and move the push-up body 146 down-words. Hence, the disc 16 moves down and is placed on the turntable 72, to be rotated together with the turntable 72 which is rotated by a motor 156. The push-up plate 143 is then separated from the push-up body 146. The pickup frame 88 moves in the direction of the arrow Y1 from the waiting position, and the disc 16 is relatively scanned by the reproducing stylus 89, to reproduce the information signal.

Next, an operation in which the disc 16 is recovered from within the reproducing apparatus 70, will now be described.

Upon completion of the reproducing operation, the motor 155 rotates in a direction opposite to the direction as the above after the motor 156 and the turntable 72 stop rotating, and the take-up shaft 157 takes up the wires 104 and 158. Accordingly, the rotary plate 140 rotates in a direction so as to loosen the wire 142, and the push-up body 146 thus moves up to push the disc 16 up. The clamping finger 100 rotates in the direction of the arrow B, to clamp the disc 16 between the clamping fingers 101 and 101a.

Upon recovering of the disc 16, the empty jacket 11 is inserted with its front end first into the reproducing apparatus 70 through the inserting opening 85. The jacket opening enlarging mechanism 71 is pushed by the jacket 11 and moves again in the direction of the arrow X1, to enlarge the opening 15 of the jacket 11. Accompanied by the insertion of the jacket 11 in the direction of the arrow X1, the disc 16 is relatively inserted inside the jacket 11 through the opening 15.

Accompanied by the above insertion of the jacket 11, the rotary plate 140 is rotated after inserting of the disc 16 into the jacket 11 is started, and the push-up body 146 moves down to a lower position to recede from the moving passage of the jacket 11. When the jacket 11 is inserted into the innermost position inside the reproducing apparatus 70, the disc 16 becomes completely incased within the jacket 11, and furthermore, the locked lid plate 12 is relatively inserted within the opening 15 of the jacket 11.

When the jacket 11 is inserted into the final position, the disc 16 is accommodated within the jacket 11, and the main part of the lid plate 12 which has been locked, is inserted inside the jacket opening 15. The jacket 11 is further inserted in the direction of the arrow X1, even after the lid plate 12 is completely inserted. Hence, the main levers 123 and 123a respectively rotate in the directions of the arrows E and F from the latching position, to release the latch of the pin 57 by the latch plate 135. Accordingly, the jacket 11 is urged in the direction of the arrow X2 by a force due to the spring 130. This force due to the spring 130 is applied to the jacket 11 through the main lever 123, contact finger 134, and lid plate 12.

Therefore, when the jacket 11 is pulled out in the direction of the arrow X2, the lid plate 12 is first pushed by the contact finger 134 due to the operation of the spring 130, and then follows the jacket 11 in a state where the lid plate 12 is pushed against the opening 15 of the jacket 11. By this movement of the lid plate 12, the sloping surface 46 partially separates from the engagement releasing member 136. Thus, the engaging arm 44 rotates outward, and the projection 45 engages inside the depression 29, to put the lid plate 12 in a state where the lid plate 12 is engaged to the jacket 11. The lid plate 12 then moves in the direction of the arrow X2 together with the jacket 11, and the disc 16 is pushed by the arcuate part 42 of the lid plate 12 and forcibly pushed out in the direction of the arrow X2 by the clamping part. Accordingly, the disc 16 is accommodated within the jacket 11 and moves together with the jacket 11, in a state where the disc 16 is prevented from slipping out of the jacket 11 by the lid plate 12, and separates from the reproducing apparatus 70 to be recovered within the disc case 10.

In addition, when the jacket 11 is pulled out together with the lid plate 12, the main levers 123 and 123a rotationally return to the original positions due to the spring 130, by rotating in opposite directions as the directions of the arrows E and F. In response to the above operation, the locking fingers 121 and 121a rotate in directions so as to close upon each other, and slip out from within the innermost part of the cutouts 55.

When the jacket 11 is pulled out to the vicinity of the inserting opening 85 of the reproducing apparatus 70, the enlarging mechanism 71 closes, the opening 15 of the jacket 11 closes, the enlarging fingers 82 slip out from the engaging windows 22 of the jacket 11, and the disc case 10 is obtained outside the reproducing apparatus 70. Hence, the disc 16 is separated from the reproducing apparatus 70, and recovered within the disc case 10.

Next, the double-insertion preventing mechanism 75 which forms the essential part of the reproducing apparatus of the present invention, will now be described.

The guide rail 76 is constructed from two parts, that is, an upper and lower part. The above mechanism 75 is assembled within the central space of the guide rail 76.

The double-insertion preventing mechanism 75 substantially comprises a lever 160 for detecting the rotational position of the main lever 123a, a locking lever 161 projecting horizontally into the case inserting passage in the vicinity of the case inserting opening, and an arresting or link 162 for determining the rotational position of the locking lever 161 to a position corresponding to the rotational position of the detecting lever 160.

The detecting lever 160 is axially supported by a pin 163, and is urged by a rotational force in the counter-clockwise direction due to a spring 164. A tip end portion 160a of the detecting lever 160 makes contact with the rear surface of the main lever 123a.

The locking lever 161 is axially supported by a pin 165, and is urged in the counter-clockwise direction by a spring 166. The locking lever 161 is located at a position where a pin 167 is locked to a V-shaped end part 162a formed on one end of the link 162. On the other hand, the other end of the link 162 is connected to the lever 160 by a pin 168. Since a longitudinal opening 162a of the link 162 is guided by a pin 169, the link 162 moves in the directions of the arrows X1 and X2 according to the rotational position of the lever 160. A locking portion 161a having an acute angle, which operates together with the L-shaped cutout 56 of the lid plate 12, is provided at the tip end of the locking lever 161. The length of the arm and the center position of rotation of the locking lever 161 are determined so that the rotational locus m shown in FIG. 5 does not intersect with the disc 16 within the reproducing apparatus in the plan view. The slider 80 comprises the finger 80a and the depression 94 and also comprises sloping cutout surfaces 80b and 80c.

Figure 3:
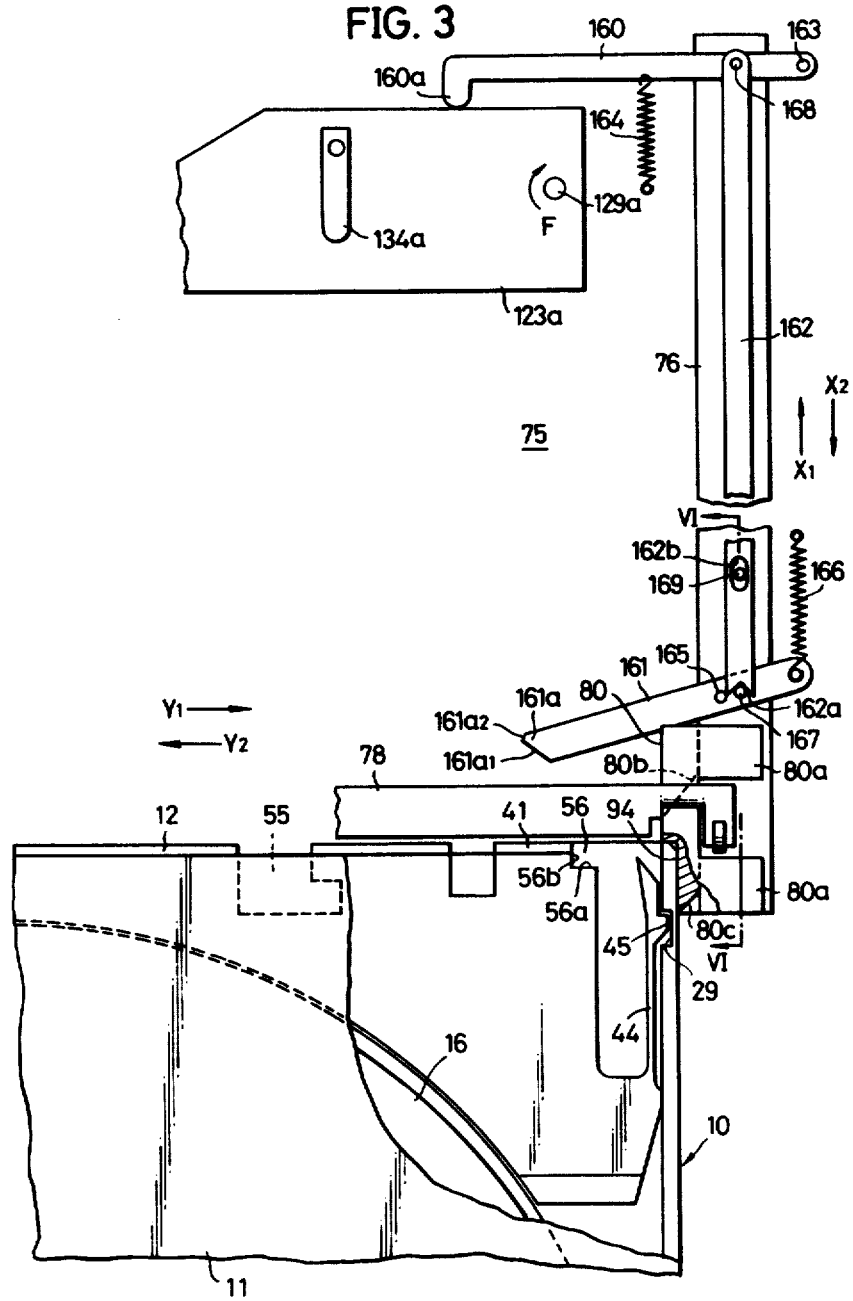
FIGS. 3, 4, and 5 are plan views respectively showing the double-insertion preventing mechanism of the reproducing apparatus in FIG. 2, in each operating state.

When a disc is not loaded within the reproducing apparatus, the double-insertion preventing mechanism 75 is in a state shown in FIG. 3, and allows the insertion of the disc case 10 having a lid. Hence, the main lever 123a rotates in a direction opposite to the direction of the arrow F, and the link 162 is in a state where the link 162 has moved in the direction of the arrow X2. In addition, the locking lever 161 is rotated in the clockwise direction against the spring 166. The locking portion 161a of the locking lever 161 is in a position opposing the rim portion 41 of the lid plate 12, of the disc case 10 which is inserted.

When the left and right ends on the front surface of the disc case 10 are respectively inserted into the depressions 94 and 95 of the respective sliders 80 and 81, and the disc case 10 is inserted in the direction of the arrow X1, the rim portion 41 of the lid plate 12 makes contact with and pushes against the locking portion 161a of the locking lever 161. Thus, the locking portion 161a slides on the front surface of the rim portion 41 in the direction of the arrow Y2, and the locking lever 161 rotates in the clockwise direction against the spring 166. Then, the main body portion of the locking lever 161 is pushed by the sloping cutout surface 80b of the slider 80, and hence, the locking lever 161 continue to rotate in the same direction. Accordingly, the disc case 10 is inserted within the reproducing apparatus 70. Accordingly, the lid plate 12 is locked, the disc 16 is clamped and left inside the reproducing apparatus, and only the jacket 11 is pulled out in the direction of the arrow X2 (refer to FIG. 4). At this point, the locking lever 161 enters within a central gap 76a of the guide rail 76 and rotates, and the locking portion 161a pushes against the side wall of the jacket 11 due to the action of the spring 166. When the jacket 11 is pulled out, the sloping cutout surface 80c of the slider 80 pushes one surface 161al of the locking portion 161a, to further rotate the locking lever 161 in the clockwise direction against the spring 166. Since the sloping cutout surface 80c and the surface 161al extend in the same direction, the locking lever 161 is positively rotated in the clockwise direction. Moreover, due to the above rotation of the locking lever 161, the locking portion 161a recedes from the receding passage of the slider 80, and the jacket 11 pulled outside the reproducing apparatus.

Figure 4:
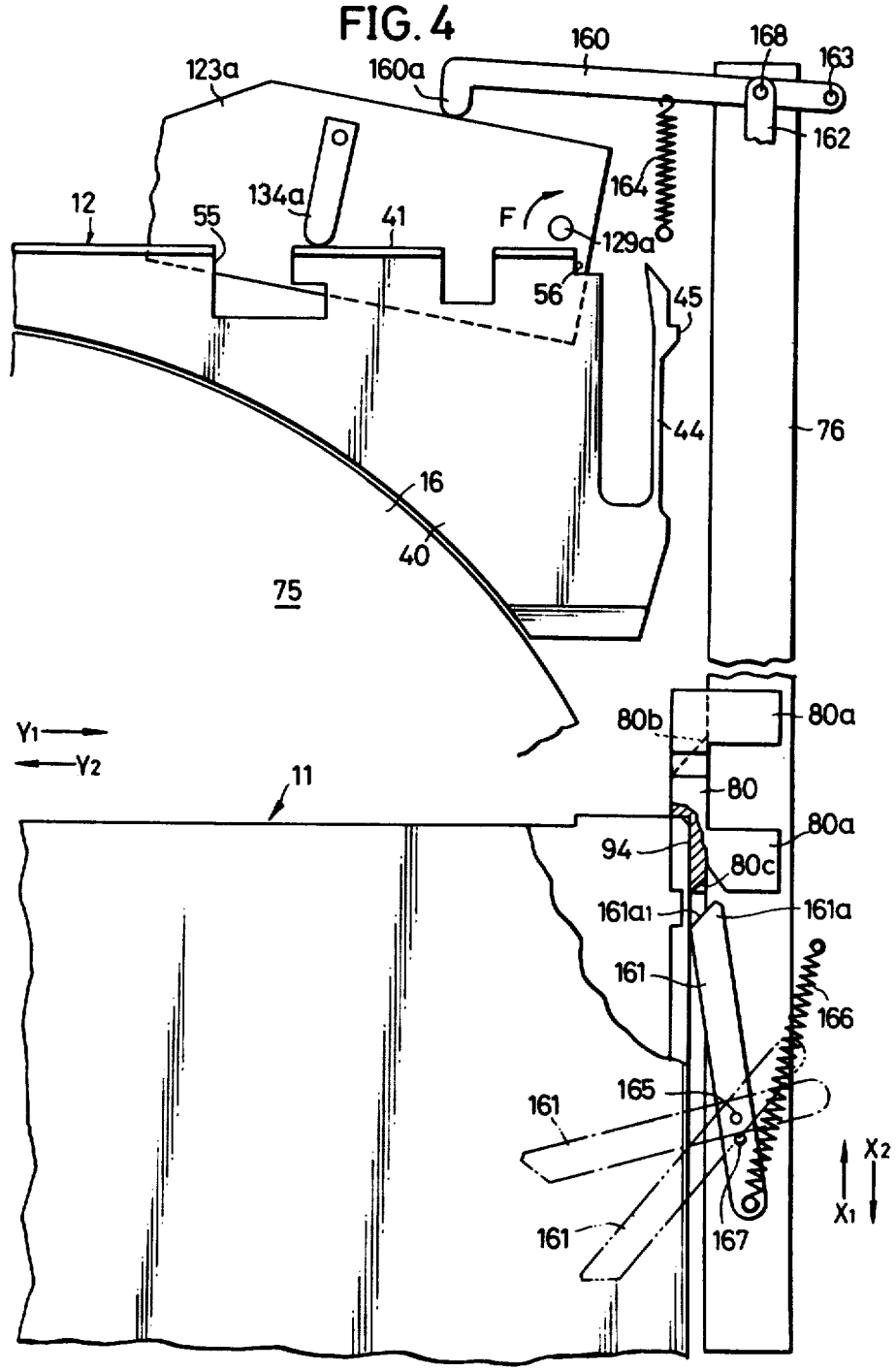

Due to the locking of the lid plate 12, the main lever 123a rotates in the direction of the arrow F. Accordingly, the detecting lever 160 rotates in the clockwise direction, and the link 162 moves in the direction of the arrow X1. Thus, when the jacket 11 is pulled outside the reproducing apparatus, the locking lever 161 rotates in the counter-clockwise direction into a position shown in FIG. 5. In FIG. 4, the one-dot chain line indicates the rotational position of the locking lever 161 in a state shown in FIG. 3, and the twodot chain line in FIG. 4 indicates the rotational position of the locking lever 161 in a state shown in FIG. 5.

Here, the locking lever 161 is at a position further rotated in the counter-clockwise direction from the position shown in FIG. 3, and the locking portion 161a of the locking lever 161 is in a position deviated from the pin 165 in the direction of the arrow X2 and opposing the L-shaped cutout 56 of the lid plate 12 of the disc case 10 which is to be inserted. The locking lever 161 is held and supported at the above rotational position during the period in which the lid plate 12 is locked at the innermost part of the reproducing apparatus. Further, in the above reproducing apparatus 70, when the lid plate 12 is locked within the reproducing apparatus, this means that the disc 16 is inside the reproducing apparatus. Hence, when the disc 16 is inside the reproducing apparatus 70, the locking lever 161 is held at the rotational position shown in FIG. 5.

When the empty jacket 11 is inserted in the direction of the arrow X1 into the reproducing apparatus to recover the disc 16 upon finishing of the reproduction, the locking portion 161a of the locking lever 161 relatively enters within the opening 15. Accordingly, the locking lever 161 is pushed by the sloping cutout surface 80b of the slider 80, and rotated in the clockwise direction. Hence, the insertion of the empty jacket 11 into the reproducing apparatus 70 is made possible, and the disc 16 is pulled outside the reproducing apparatus after being accommodated within the jacket 11.

Next, an operation will be described in which the insertion of a disc case 10 having a disc 16 accommodated therein is arrested, in a state where a disc is already loaded within the reproducing apparatus 70.

Figure 5:
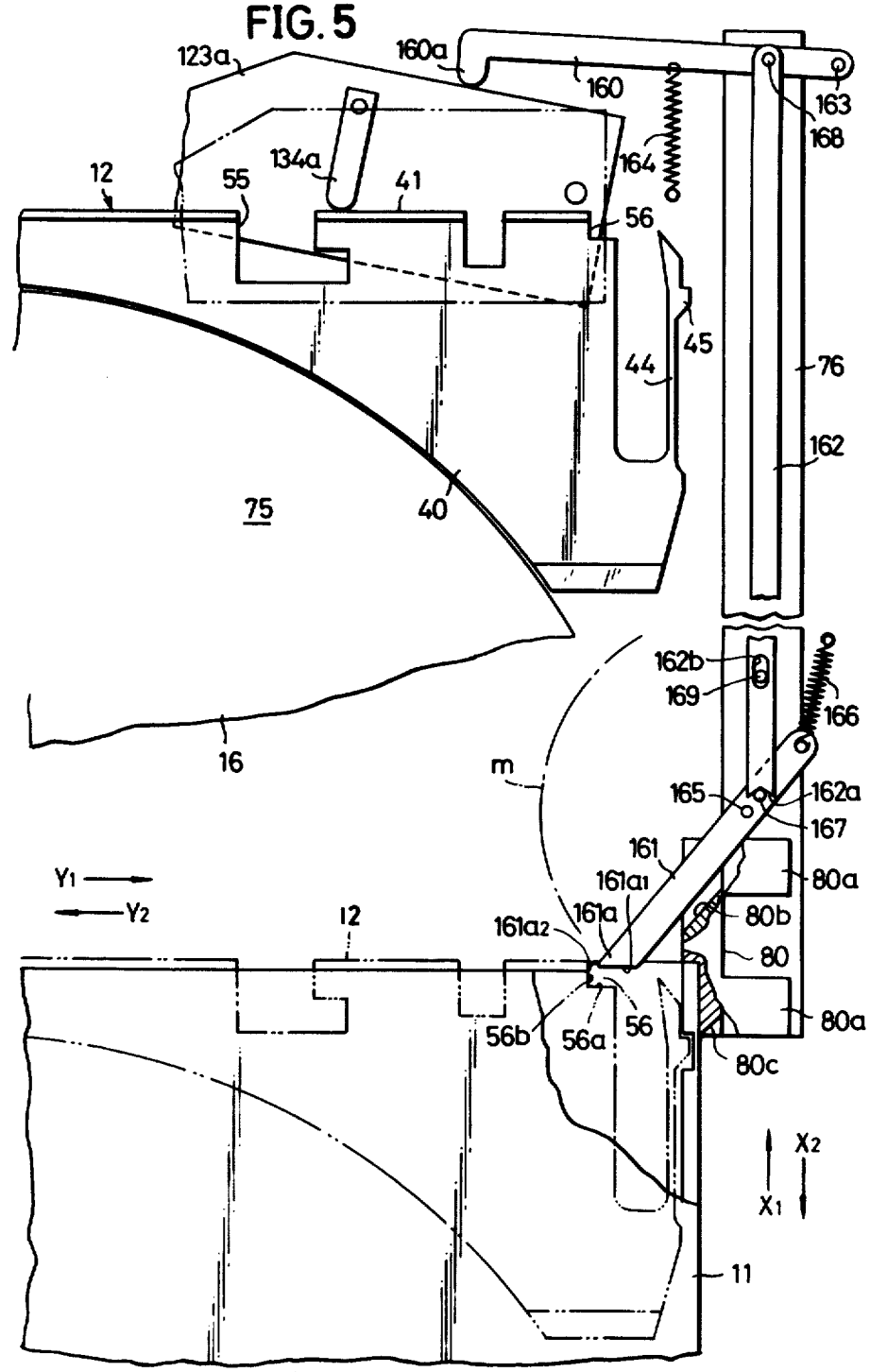

When an attempt is made to insert a jacket 11 (disc case 10) having the lid plate 12 connected thereto into the reproducing apparatus 70 in a state where a disc 16 is already loaded inside the reproducing apparatus 70 as shown in FIG. 5, the locking portion 161a of the locking lever 161 relatively enters within the L-shaped cutout 56 of the lid plate 12. One surface 161a1 of the locking portion 161a is pushed by a surface 56a extending in the direction of the arrow Y of the cutout 56, and thus, the locking lever 161 starts to rotate in the clockwise direction while the locking portion 161a starts to move in the direction of the arrow Y2. However, the rotation of the locking lever 161 in the clockwise direction upon insertion of the disc case 10 is arrested since a surface 161a2 of the locking portion 161a makes contact with a surface 56b extending in the direction of the arrow X of the cutout 56. Therefore, the insertion of the disc case 10 in the direction of the arrow X1 is restricted in the vicinity of the inserting opening 85, and the erroneous double-insertion operation of the disc is positively prevented.

In addition, the sloping cutout surface 80b of the slider 80 is at a position separated from the locking lever 161 during the state where the insertion of the disc case 10 into the reproducing apparatus is arrested. Accordingly, there is no possibility that the locking lever 161 is pushed by the slider 80 and rotated.

In order for the disc case 10 to operate together with the reproducing apparatus having the above described construction, it is sufficient to form the cutout 56 on the opening end side of the lid plate 12, and a cutout need not be formed on the side of the opening 15 of the jacket 11. When a cutout is formed on the side of the opening of the jacket 11, an inconvenience is introduced in which the recording surface of the disc 16 is damaged when the disc 16 passes through the opening 15. That is, the opening end part of the jacket 11 is positioned in front (in the direction of the arrow X1) of the innermost part of the cutout, and when the disc 16 enters into or leaves from the jacket 11, especially at the point where the groove guard reaches the innermost part of the cutout, the opening end edge of the jacket 11 scratches the recording surface of the disc if the disc is slightly inclined with respect to the jacket. This situation is substantial especially when the cutouts are formed at positions in the vicinity of the two sides of the jacket. However, since the cutouts are not formed on the side of the opening 15 of the jacket 11, the above described inconveniences are not introduced. Moreover, since the cutout 56 is formed in the lid plate 12 and not in the jacket 11, the mechanism according to the present invention can easily be applied to a reproducing apparatus constructed to enlarge the opening of the jacket upon insertion of a disc case for accommodating a disc therein.

Furthermore, the double-insertion preventing mechanism 75 can be arranged and provided within a narrow space, because the locking lever 161 rotates in the horizontal plane. Moreover, accidents are prevented in which the jacket 11 is unnecessarily crushed, since the locking lever 161 acts on the lid plate 12 and not on the jacket 11.

In a case where the case 10 is inserted with the front and back sides reversed, the cutout 56 provided on the opposite side of the above cutout 56 in the lid plate 12 acts on the locking lever 161, and the insertion of the disc case having the lid plate 12 is also prevented.

The above described double-insertion preventing mechanism 75 can also be provided and assembled within both the left and right hand side guide rails of the reproducing apparatus 70.

Next, another embodiment of a double-insertion preventing mechanism according to the present invention will now be described in conjunction with FIGS. 7 through 9. The present embodiment of a double-insertion preventing mechanism is constructed to detect whether the disc case being inserted, in a state where a disc is already loaded within the reproducing apparatus, is a disc case comprising only the jacket or having the lid plate by use of a lever corresponding to the locking lever 161 in the above embodiment of the invention, and in a case where the disc case being inserted is a disc case comprising the lid plate, the slider is locked by use of a separate member.

Figure 8:
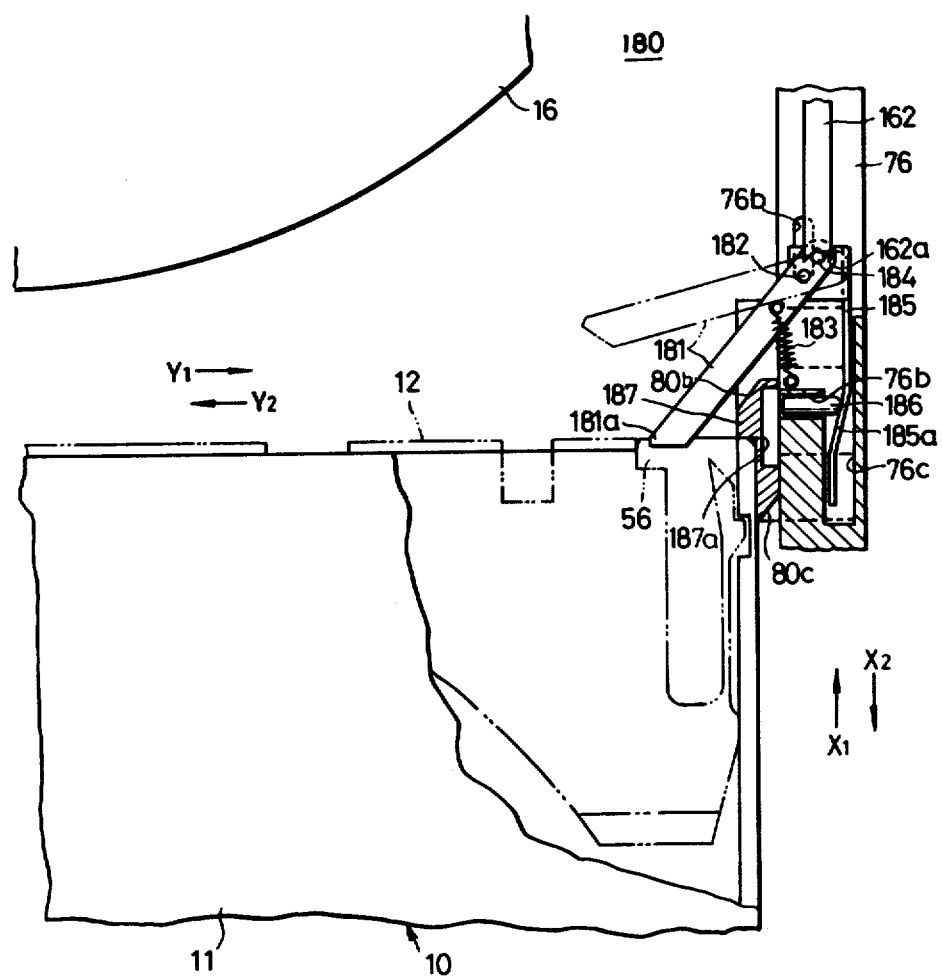
Figure 9:
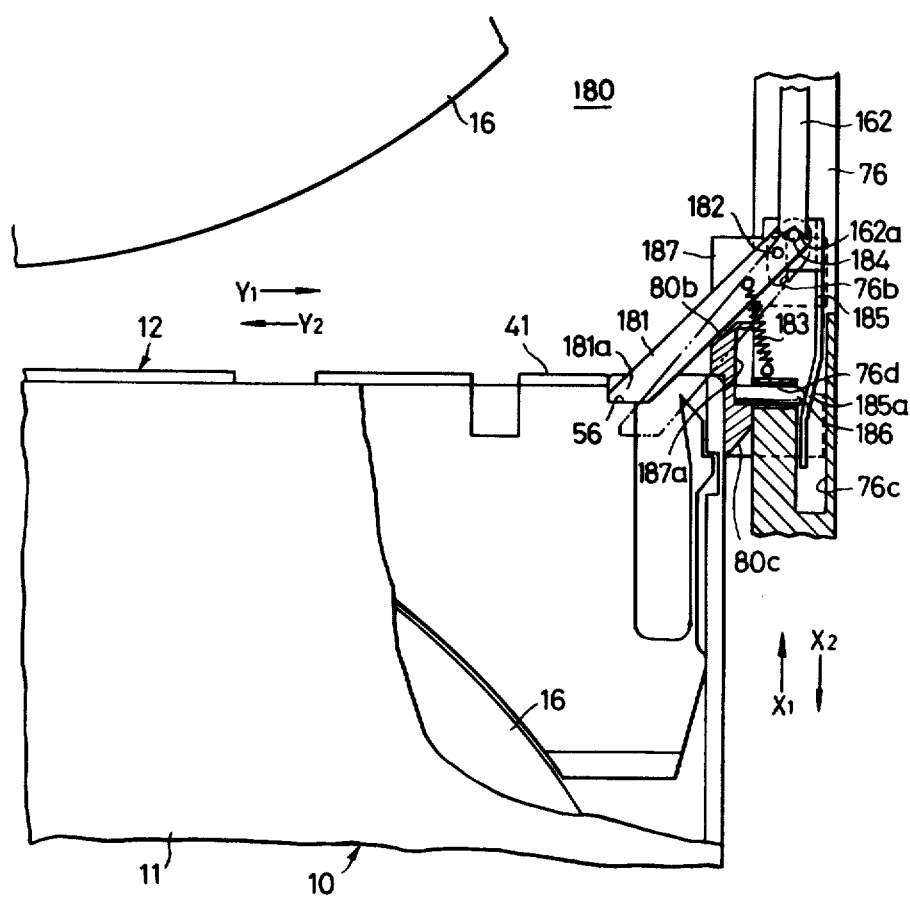

In each of the FIGS. 7, 8, and 9, those parts which are the same as those corresponding parts in FIGS. 3 through 5 are designated by the like reference numerals, and their description will be omitted. FIG. 7 shows a state where a disc is not loaded within the reproducing apparatus, and FIGS. 8 and 9 respectively show a state where a disc case only comprising the jacket is inserted, and a state where a disc case having the lid plate is inserted, into the reproducing apparatus when a disc is already loaded within the reproducing apparatus.

In a double-insertion preventing mechanism 180 shown in FIG. 7, a pin 182 of a lever 181 is inserted and fitted within the longitudinal opening 76b (extending in the direction of the arrow X) of the guide rail 76 to support the lever 181. This lever 181 is displaced in the direction of the arrow X2 due to a spring 183 and is urged to rotate in the counter-clockwise direction. The rotation of the lever 181 within the horizontal plane in the counter-clockwise direction is restricted in a state where a pin 184 is locked by the V-shaped end part 162a of the link 162, and a locking portion 181a having an acute angle (having the same construction as the above described locking portion 161a) is at a position opposing the rim portion 41 of the lid plate 12, of the disc case 10 which is being inserted.

A cam member 185 connected to the pin 182 is guided by a guide wall 76c of the guide rail 76, and moves in the directions of the arrows X1 and X2. A cam portion 185a acts on a locking pin 186. This locking pin 186 is inserted within a guide hole 76d of the guide rail 76, in a freely movable manner in the direction of the arrow Y. The construction of a slider 187 is such that a depression 187a is formed at a position opposing the above locking pin 186, in addition to the sloping cutout surfaces 80b and 80c formed thereon. In the state shown in FIG. 7, the cam member 185 has moved in the direction of the arrow X2, and the locking pin 186 has moved in the direction of the arrow Y1 due to the action of the spring (not shown) and has retreated within the guide rail 76.

By the inserting operation in which the disc case 10 having the lid plate 12 is inserted within the reproducing apparatus, the lever 181 is pushed by the rim portion 41 of the lid plate 12, and is rotated in the clockwise direction within the horizontal plane as in the above described case. The rotation of the lever 181 is performed in a state where the pin 182 is moved in the direction of the arrow X2 due to the action of the spring 183, and the cam member 185 is held at the position shown in FIG. 7. Accordingly, the locking pin 186 remains retreated within the guide rail 76, and the insertion of the disc case 10 is performed without being prevented. Moreover, the lever 181 rotates to the position shown by the two-dot chain line in FIG. 7.

When a disc is loaded within the reproducing apparatus, the lever 162 is at a position moved in the direction of the arrow X1, and the lever 181 is at a position rotated in the counter-clockwise direction from the rotational position in FIG. 7 (shown by the two-dot chain line in FIG. 8) as shown in FIG. 8.

In a case where only the jacket 11 is inserted into the reproducing apparatus in the direction of the arrow X1, the locking portion 181a at the tip end of the lever 181 relatively enters within the jacket 11, while the lever 181 is pushed by the sloping cutout surface 80b of the slider 187 and is rotated in the clockwise direction against the spring 183. This rotation of the lever 181 is also performed while the pin 182 is held at a position moved in the direction of the arrow X2 due to the action of the spring 183 (the locking pin 816 remains retreated within the guide rail 76), and the empty jacket 11 is allowed to enter within the reproducing apparatus to recover the disc.

When an attempt is made to insert the disc case 10 having the lid plate 12 into the reproducing apparatus, the insertion is prevented as shown in FIG. 9. That is, when an attempt is made to insert the disc case 10 having the lid plate 12 into the reproducing apparatus, the locking portion 181a of the lever 181 enters within the L-shaped cutout 56 of the lid plate 12 and is restricted of the movement in the direction of the arrow Y2. Accordingly, upon initial insertion of the disc case 10, the pin 182 at the base part side of the lever 181 is guided by the longitudinal opening 76b, and the lever 181 moves in the direction of the arrow X1 in a state where the rotation of the lever 181 is restricted since the tip end of the lever 181 is locked by the cutout 56. The cam member 185 also moves in the direction of the arrow X1 along the guide wall 76c, due to the movement of the lever 181. Since the cam member 185 moves in a state restricted of the rotation, the locking pin 186 is pushed by the cam portion 185a and moves in the direction of the arrow Y2 against the spring (not shown). Hence, the locking pin 186 projects outwards from the guide rail 76 and enters within the depression 187a of the slider 187. As shown in FIG. 9, the movement of the slider 187 in the direction of the arrow X1 is restricted due to the locking pin 186 projecting from the guide rail 76, and the insertion of the disc case 10 having the lid plate 12 is prevented.

Upon moving of the lever 181 in the direction of the arrow X1, the link 162 also moves in the same direction, however, since the detecting lever 160 can rotate in the clockwise direction against the spring 164, no problems are introduced.

In the present embodiment of the invention, the double-insertion of a disc case 10 having the lid plate 12 is performed by locking the slider 187 to the locking pin 186. Therefore, the inserting force upon erroneous and forced insertion of the disc case 10 having the lid plate 12 into the reproducing apparatus is not concentrated between the locking portion 181a at the tip end of the lever 181 and the cutout 56 of the lid plate 12. Accordingly, inconveniences are not introduced in which the cutout 56 in the lid plate 12 breaks or the lever 181 is bent.

It is obvious that the mechanism of the present embodiment can be assembled and provided in both the left and right hand side guide rails 76 and 77.

As described above, the disc-shaped recording medium reproducing apparatus according to the present invention comprises the following advantages. Firstly, a so-called double-inserting operations is prevented in which a disc case having a jacket with an opening and a lid plate for closing the opening of the jacket and accommodated with a disc therein, is erroneously inserted into the reproducing apparatus, in a state where a disc is already loaded within the reproducing apparatus.

Secondly, since the detecting means for detecting whether the disc case being inserted has a lid plate in the state where a disc is already loaded within the reproducing apparatus operates together with the cutouts in the front side of the lid plate instead of in the disc case, there is no need to form cutouts in the jacket, accordingly eliminating the danger of the disc being scratched by the edges of the opening of the jacket when the disc passes through the opening of the jacket.

Thirdly, since the above detecting means is constructed to operate together with the shape of the lid plate, the mechanism can also be applied to a reproducing apparatus in which the opening of the jacket is enlarged upon insertion of the disc case into the reproducing apparatus.

Fourthly, the reproducing apparatus can be constructed into a thin-type apparatus, because the lever positioned opposing the lid plate of the disc case is arranged to move in the horizontal plane.

Fifthly, since the preventing of the double-insertion is performed by preventing the movement of the slider, the inserting force is not concentrated in one part of the lid plate even when an attempt is made to forcibly insert the disc case into the reproducing apparatus, and thus, damage to the disc case having the lide plate and the mechanism inside the reproducing apparatus is positively prevented.

The present invention is not only reduced into practice with respect to an apparatus having a mechanism which operates together with a disc case comprising a jacket and a lid plate for closing the opening of the jacket so that a disc accommodated within the jacket does not slip outside, to enlarge the opening of the jacket, and a mechanism which rides over the lid plate to clamp the disc, as in the above described embodiment of the invention. The present invention many be reduced into practice in a reproducing apparatus of a different type from that in the above embodiment of the invention, for example, in a reproducing apparatus which operates together with a jacket and a frame member or tray having an annular holding part which is accommodated within the jacket together with a disc, and loads the disc into the reproducing apparatus together with the frame member or tray, by clamping the above frame member or tray and pulling the jacket outside the reproducing apparatus.

Further, this invention is not limited to these embodiments but various variations and modifications may be made without departing from the scope of the invention.

What is claimed is:

1. A reproducing apparatus for reproducing a disc-shaped recording medium which is accomodated within a case, said case comprising a jacket which has a space for accomodating said disc-shaped recording medium and an opening for allowing said disc-shaped recording medium to go in and out of said jacket, and a lid member inserted through said opening of said jacket for closing said opening of said jacket, said reproducing apparatus comprising:

an inserting opening through which said case is inserted;

a turntable for rotating said disc-shaped recording medium;

clamping means for clamping at least one of said disc-shaped recording medium or said lid member provided at the innermost part on the opposite side from said inserting opening with respect to said turntable;

detecting means for detecting whether said disc-shaped recording medium is loaded within said reproducing apparatus; and arresting means provided at the vicinity of said inserting opening, for arresting the insertion of a jacket having said lid member into said reproducing apparatus and allowing the insertion of a jacket not having said lid member into said reproducing apparatus, by displacing according to the detecting operation of said detecting means, said arresting means allowing the insertion of the jacket having or not having said lid member into said reproducing apparatus in a state where said detecting means is not performing a detecting operation.

2. A reproducing apparatus as claimed in claim 1 in which said arresting means has an arresting lever which rotationally undergoes displacement according to the detecting operation of said detecting means so that the tip end of said arresting lever moves in a direction adjacent said inserting opening, said lid member has a cutout for engaging with the tip end of said rotationally displaced arresting lever, said arresting lever engaging to the cutout of said lid member being inserted into said reproducing apparatus to become incapable of rotating, to relatively arrest further insertion of said lid member.

3. A reproducing apparatus as claimed in claim 2 in which said arresting lever rotationally displaced according to the detecting operation of said detecting means is pushed by said lid member, and rotational displacing of said arresting lever in a direction to become parallel with said inserting opening is arrested by a side surface of the cutout in said lid member.

4. A reproducing apparatus as claimed in claim 2 in which length of the arm and rotational center position of said arresting lever is determined so that a rotational locus of the tip end of said arresting lever does not intersect with said disc-shaped recording medium within said reproducing apparatus on the plan view.

5. A reproducing apparatus as claimed in claim 1 in which said detecting means has lever means which is pushed and moved by said lid member upon insertion of said case into the innermost position within said reproducing apparatus, and means for transmitting the displacement of said pushed lever means to said arresting means and displacing said arresting means.

6. A reproducing apparatus as claimed in claim 5 which further comprises locking means for locking said lid member by operating together with the lever means of said detecting means.

7. A reproducing apparatus as claimed in claim 1 which further comprises rail members respectively provided on the left and right sides of a case inserting passage and extending in the inserting direction of said case, and case supporting and sliding members for supporting the left and right side ends of said case and sliding along said rail members upon insertion of said case into said reproducing apparatus, said arresting means further having locking mechanisms for locking said case supporting and sliding members when said detecting means is detecting the existence of said disc-shaped recording medium within said reproducing apparatus.

* * * * *